United States Patent [19]

Tabata et al.

[11] 4,025,441
[45] May 24, 1977

[54] OZONE GENERATING APPARATUS

[75] Inventors: Norikazu Tabata; Shigenori Yagi; Takanori Ueno, all of Amagasaki, Japan

[73] Assignee: Mitsubishi Denki Kabushiki Kaisha, Tokyo, Japan

[22] Filed: Aug. 11, 1975

[21] Appl. No.: 603,655

[30] Foreign Application Priority Data

Aug. 28, 1974 Japan .............................. 49-99200
Nov. 5, 1974 Japan ............................. 49-127405

[52] U.S. Cl. ................................. 250/540; 250/541
[51] Int. Cl.² ........................................ C01B 13/11
[58] Field of Search ........................... 250/532–541

[56] References Cited

UNITED STATES PATENTS

| | | | |
|---|---|---|---|
| 830,975 | 9/1906 | Dechaux | 250/540 X |
| 1,403,025 | 1/1922 | Haase | 250/539 |
| 2,010,081 | 8/1935 | Hartman | 250/540 |
| 2,643,224 | 6/1953 | Niccoli | 250/540 |
| 3,766,051 | 10/1973 | Bollyky | 250/540 |

Primary Examiner—John H. Mack
Assistant Examiner—Aaron Weisstuch
Attorney, Agent, or Firm—Oblon, Fisher, Spivak, McClelland & Maier

[57] ABSTRACT

An ozone generating apparatus is disclosed which is quite compact and has a high yield of ozone and which prevents an abnormal rise of temperature in a discharge gap by recycling a liquid coolant having low electric conductivity through an inner part of a high voltage electrode tube of a silent discharge ozonizer to cool the electrode tube.

10 Claims, 7 Drawing Figures

4,025,441

OZONE GENERATING APPARATUS

BACKGROUND OF THE INVENTION

1. Field of the Invention

The invention relates to ozone generating apparatus.

2. Description of the Prior Art

The structure and an operation of a conventional silent discharge ozonizer will be illustrated with reference to FIG. 1.

In FIG. 1, the reference 1 designates an outer cylinder; 2 designates a metallic cylindrical grounded electrode; 3 designates a high voltage electrode tube made of a dielectric; 4 designates a high voltage electrode which closely contacts the inner surface of the high voltage electrode tube; 5 designates a bushing; 6 designates an inlet for a liquid coolant for cooling the metallic cylindrical grounded electrode 2; 7 designates an outlet thereof; 8 designates an inlet of the raw material gas; and 9 designates an outlet of the ozonized gas.

When the AC voltage (10–20 KV) is applied to the high voltage electrode 4, a silent discharge is formed in the gap between the high voltage electrode tube 3 and the metallic cylindrical grounded electrode 2. Accordingly, a part of the oxygen in the feed gas is ozonized by passing the raw material gas from feed gas inlet 8 into the discharge gap whereby the ozonized gas is discharged from outlet 9. The feed gas is dried air or oxygen.

Only a part of the discharge energy (about 5% for air feed and about 10% for oxygen feed) is used for the formation of ozone. The other energy becomes heat loss. The yield of ozone is decreased if the heat is not effectively removed to prevent a rise of the temperature in the discharge gap. Accordingly, the outer surface of the metallic cylindrical grounded electrode 2 is cooled with a liquid coolant. It is usual to use water as the liquid coolant.

In the conventional ozone generator, in order to maintain the temperature in the discharge gap below the limit capable of ozone generation, it is necessary to have less than about 0.2 watt/cm$^2$ of discharge density (discharge power per area of discharge). Accordingly, a large area of discharge, i.e., a rather large sized apparatus is required for practical operation.

SUMMARY OF THE INVENTION

An object of the invention is to overcome these disadvantages and to provide a compact ozone generating apparatus for imparting high discharge density by effectively cooling both the metallic cylindrical grounded electrode and the high voltage electrode tube.

In order to effectively cool the high voltage electrode tube, it is necessary to use a liquid coolant. However, there are certain technical problems which must be solved: the high voltage electrode tube must be cooled while insulated from high voltage; the liquid coolant must be completely sealed to prevent contamination of the air feed with the liquid; a firing accident must be prevented even though the high voltage electrode tube may be broken; and repair of the apparatus should be relatively simple.

The foregoing and other objects are attained in accordance with one aspect of the present invention through the provision of a compact ozone generating apparatus having a high yield of ozone which comprises an inlet and an outlet for a coolant at the high voltage electrode which is formed concentrically to a cylindrical grounded electrode; a coolant having low electric conductivity which is recycled through the high voltage electrode to cool the high voltage electrode; and a coolant which is recycled through the cylindrical grounded electrode to cool it.

The coolant for cooling the high voltage electrode may be, for example, deionized water which is cooled by a cooling device located exteriorly of the apparatus. The temperature of the discharge gap can be maintained at a desirably low temperature by cooling the high voltage electrode.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
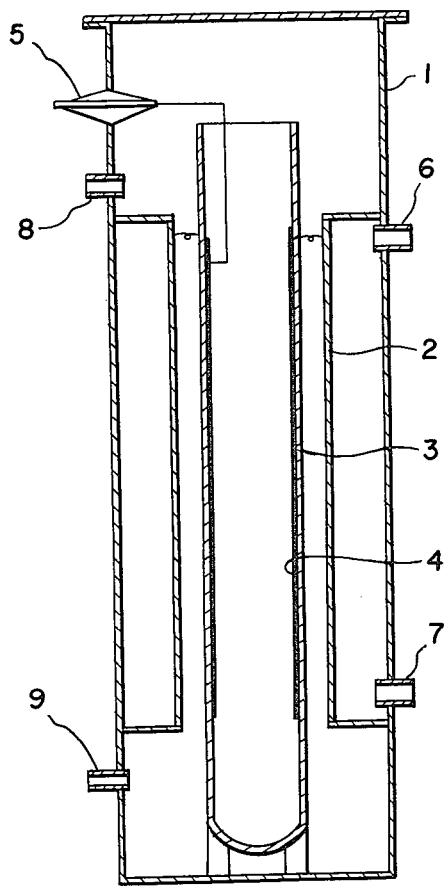
FIG. 1 is a sectional view of a conventional ozone generating apparatus.

Referring now to the drawings, wherein like reference numerals designate identical or corresponding parts throughout the several views, and more particularly to FIGS. 2 – 7 thereof, certain embodiments of the invention will be described.

Figure 2:
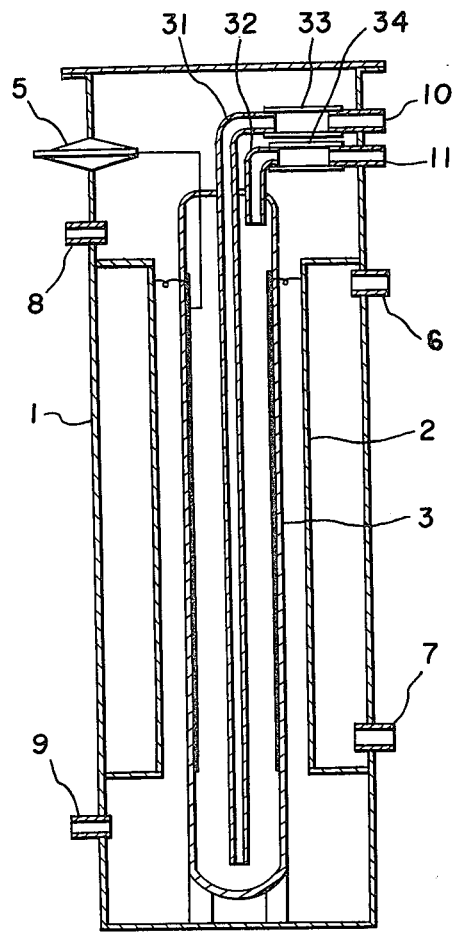
FIG. 2 is a sectional view of one embodiment of an ozone generating apparatus according to the invention.

FIG. 2 is a sectional view of one embodiment of a body of the ozone generating apparatus of the invention. The references 1 – 9 are substantially the same as those of FIG. 1. However, the high voltage electrode tube 3 is sealed and an inlet 31 and an outlet 32 for the coolant are formed at the upper part of the high voltage electrode tube. The reference 10 designates an inlet pipe for the coolant and 11 designates an outlet pipe for the coolant; 33 designates an inlet connecting pipe for the coolant and 34 designates an outlet connecting pipe for the coolant.

The ozone generating operation realized by the apparatus is substantially similar to that of FIG. 1. However, the liquid coolant is passed through the inner part of the high voltage electrode tube 3 to cool it whereby it is possible to impart higher than 1 watt/cm$^2$ of discharge density.

Figure 3:
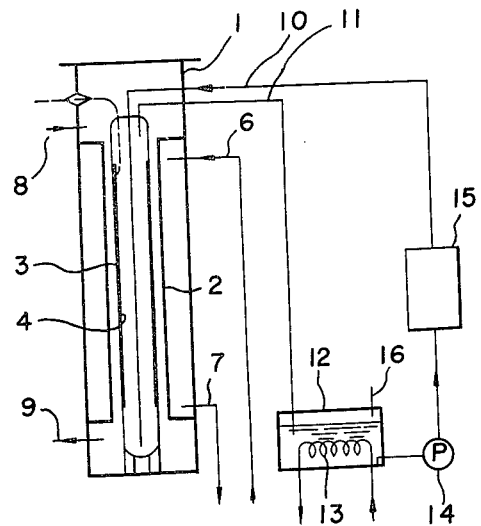
FIGS. 3 and 4 are respectively system diagrams of embodiments of cooling systems of the ozone generating apparatus of FIG. 3.

FIG. 3 shows one embodiment of the cooling system of the invention. In FIG. 3, the reference 12 designates a cooling vessel; 13 designates a cooling coil; 14 designates a pump; 15 designates an ion-exchange resin column, and 16 designates an air discharger.

In the cooling system, the metallic cylindrical grounded electrode tube 2 is cooled with conventional cooling water and the high voltage electrode tube 3 is cooled by recyling a deionized water. In the recycling system, an ion-exchange resin is disposed to maintain higher than 1 MΩ-cm of resistance of the deionized water whereby the high voltage insulation problem is completely solved, and stable continuous operation can be attained.

In comparison with conventional apparatus utilizing the electric conductivity of water in order to use water as an electrode and wherein the apparatus is cooled by spraying water and recycling it, the apparatus of the invention imparts excellent stability in a simple structure. The high voltage electrode tube 3 is of the sealed type and a small inlet and outlet for the liquid coolant are formed. Accordingly, it is relatively simple to form a seal with the connecting pipes 33, 34 and the contamination of the feed gas with the water can be prevented.

Even though the high voltage electrode tube 3 may be accidentally broken, the coolant is deionized water. Accordingly, there is no firing danger and repair can be easily made by replacing the high voltage electrode tube 3 and drying the inner part.

Figure 4:
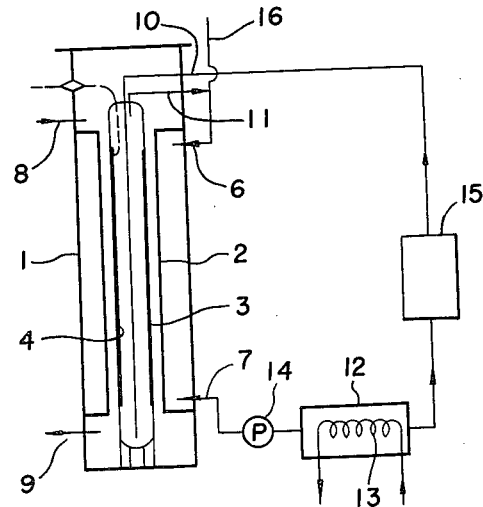

FIG. 4 shows another embodiment of the cooling system of the invention. The feature of FIG. 4 different from that of FIG. 3 is the cooling of the metallic cylindrical grounded electrode 2 with recycled deionized water as well as the high voltage electrode tube 3.

When the apparatus is preferably operated at a cooling temperature lower than ambient temperature the cooling coil 13 can be commonly used. When it is cooled to lower than 0° C, a liquid coolant consisting of deionized water and a glycol such as ethyleneglycol, propyleneglycol, etc. may be used. In this case, it is easy to maintain higher than 1 MΩ-cm of resistance of the coolant by disposing an ion-exchange resin in the recycle system. There is no firing danger in this case.

As stated above, in accordance with the invention, it is possible to provide an ozone generating apparatus which has the following advantages compared with conventional apparatus.

Since the body of the ozone generating apparatus has a sealed type high voltage electrode tube which is disposed concentrically to the metallic cylindrical grounded electrode and since the ion-exchange resin is disposed in a coolant recycling system so as to cool the apparatus with deionized water or a mixture of deionized water and a glycol which has a high resistance by recycling it, a. the discharge density can be ten times that of the conventional apparatus. Accordingly, the body of the ozone generating apparatus can be decreased to about one tenth the size.

b. high voltage insulation can be attained and stable continuous operation can be attained even though the high voltage electrode tube is cooled with a liquid coolant.

c. the dielectric which may be broken during transportation is the only high voltage electrode tube. Accordingly, the high voltage electrode tube can be easily inserted and safe transportation is more readily realized. Even though the high voltage electrode tube may be broken, it is quite easy to repair by washing the inner part of the body and drying it and by replacing the high voltage electrode tube.

Figure 5:
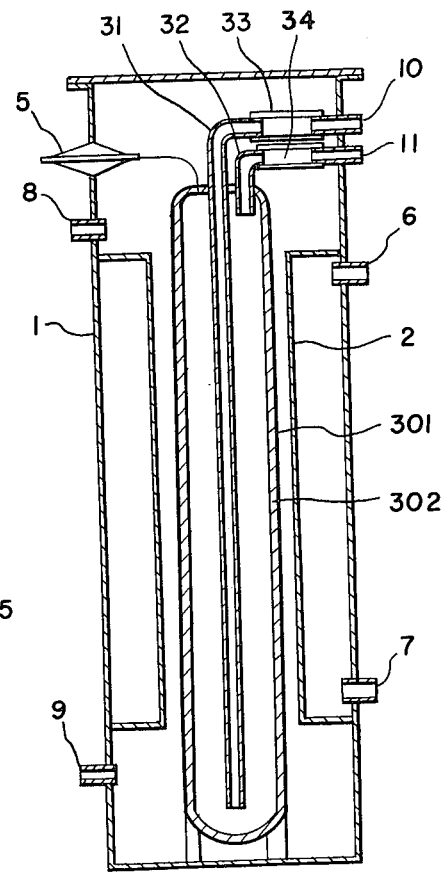
FIG. 5 is a sectional view of another embodiment of a body of the ozone generating apparatus according to the invention.

FIG. 5 is a sectional view of another embodiment of body of the ozone generating apparatus according to the invention.

In FIG. 5, the references 1 – 2, and 5 – 9 are substantially the same as those of FIG. 2. However, a high voltage electrode tube 301 is sealed with metal and a lining of a dielectric 302 is formed on the outer surface thereof. An inlet 31 and an outlet 32 for the liquid coolant are disposed at the upper part of the tube. The reference 10 designates an inlet pipe for the coolant and 11 designates an outlet pipe for the coolant; 33 designates an inlet connecting pipe for the coolant and 34 designates an outlet connecting pipe for the coolant.

The operation of the ozone generating apparatus is substantially the same as that of FIG. 2. In this embodiment, the discharge density can be higher than 1 watt/cm$^2$ because the high voltage electrode tube 301 is cooled by passing the liquid coolant through the inner part of the high voltage electrode tube 301.

Figure 6:
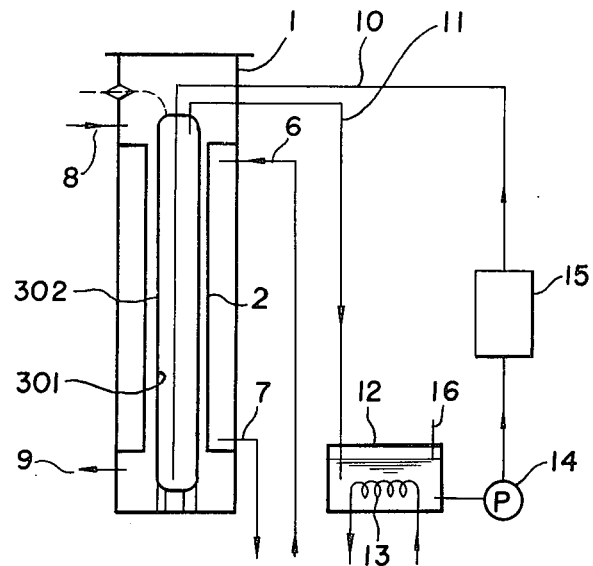
FIGS. 6 and 7 are respectively system diagrams of embodiments of cooling systems of the ozone generating apparatus of FIG. 5.
Figure 7:
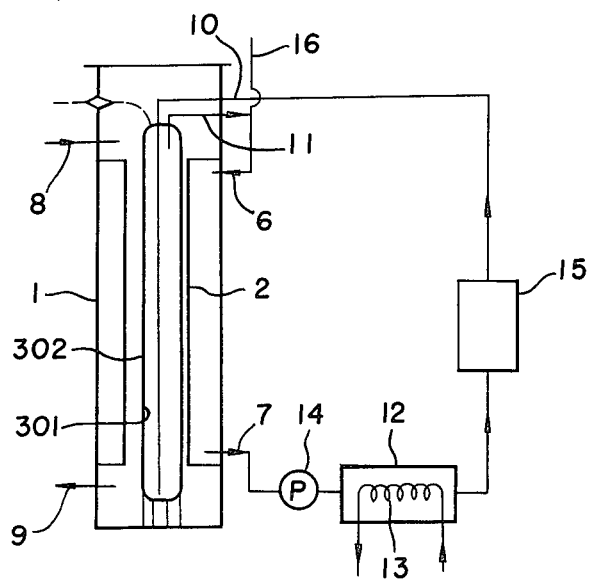

FIGS. 6 and 7 show embodiments of cooling systems of the apparatus of FIG. 5. The features of FIG. 6 correspond to those of FIG. 3. The features of FIG. 7 correspond to those of FIG. 4. The structure of the elements of FIGS. 6 and 7 are substantially the same as those of FIGS. 3 and 4 except for the high voltage electrode tube.

In the embodiments of FIGS. 5 – 7, the advantages of (a) – (b) for the embodiment of FIGS. 2 – 4 can be attained as well as the following advantages.

a. Even though the dielectric of the outer surface of the high voltage electrode tube may accidentally suffer dielectric breakdown, water does not leak and an accident will not affect the other part by turning off the high voltage.

b. The high voltage electrode tube can be easily inserted and safe transportation is therefore more easily attained.

Even though a dielectric at the outer surface of the high voltage electrode tube may suffer dielectric breakdown, it is easy to repair by exchanging the high voltage electrode.

In the apparatus of the embodiments of the invention, when either the inlet or the outlet for the coolant is extended to the bottom of the high voltage electrode tube and the other is disposed at the upper part as shown in FIG. 5, the liquid coolant flows smoothly without being retained in the high voltage electrode tube.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An ozone generating apparatus comprising:
    a high voltage electrode tube having an inner part, an inlet pipe and an outlet pipe for a liquid coolant extending into said high voltage electrode tube in a fluid-tight manner;
    a grounded electrode disposed concentrically about the high voltage electrode tube so as to define an air gap therebetween within which air to be ozonized may be passed, and adapted to be cooled by a coolant which is recirculated through a path which is sealed off or separated from said air gap so as to prevent contamination of said air to be ozonized by said coolant;
    the high voltage electrode tube being cooled by recycling a low electric conductivity liquid coolant through the inlet pipe, the inner part, and the outlet pipe of the high voltage electrode tube, and being sealed so as to likewise prevent contamination of said air to be ozonized by said coolant;

the liquid coolant for the high voltage electrode tube being deionized water and an ion-exchange resin being disposed in a recycling passage of the deionized water to maintain the electric conductivity of the deionized water below a predetermined value.

2. The ozone generating apparatus according to claim 1 wherein the high voltage electrode tube comprises a sealed type dielectric cylinder.

3. The ozone generating apparatus according to claim 1 wherein the high voltage electrode tube comprises a sealed metallic cylinder and a lining of a dielectric is formed on the outer surface of the metallic cylinder.

4. The ozone generating apparatus according to claim 1 wherein one of an inlet or an outlet for the liquid coolant is extended to the bottom of the high voltage electrode tube and the other of said inlet or outlet is disposed at the upper part of the high voltage electrode tube so as to permit the liquid coolant to flow without being retained in the high voltage electrode tube.

5. The ozone generating apparatus according to claim 1 wherein the grounded electrode is cooled by recycling the same liquid coolant used for cooling the high voltage electrode tube.

6. An ozone generating apparatus comprising:
a high voltage electrode tube having an inner part, an inlet pipe and an outlet pipe for a liquid coolant extending into said high voltage electrode tube in a fluid-tight manner;
a grounded electrode disposed concentrically about the high voltage electrode tube so as to define an air gap therebetween within which air to be ozonized may be passed, and adapted to be cooled by a coolant which is recirculated through a path which is sealed off or separated from said air gap so as to prevent contamination of said air to be ozonized by said coolant;
the high voltage electrode tube being cooled by recycling a low electric conductivity liquid coolant through the inlet pipe, the inner part, and the outlet pipe of the high voltage electrode tube, and being sealed so as to likewise prevent contamination of said air to be ozonized by said coolant;
the liquid coolant for the high voltage electrode tube being a mixture of a deionized water and a glycol and an ion-exchange resin being disposed in a recycling passage of the deionized water to maintain the electric conductivity of the deionized water below a predetermined value to be able to cool below 0° C.

7. The ozone generating apparatus according to claim 6 wherein the high voltage electrode tube comprises a sealed type dielectric cylinder.

8. The ozone generating apparatus according to claim 6 wherein the high voltage electrode tube comprises a sealed metallic cylinder and a lining of a dielectric is formed on the outer surface of the metallic cylinder.

9. The ozone generating apparatus according to claim 6 wherein one of an inlet or an outlet for the liquid coolant is extended to the bottom of the high voltage electrode tube and the other of said inlet or outlet is disposed at the upper part of the high voltage electrode tube so as to permit the liquid coolant to flow without being retained in the high voltage electrode tube.

10. The ozone generating apparatus according to claim 6 wherein the grounded electrode is cooled by recycling the same liquid coolant used for cooling the high voltage electrode tube.

* * * * *